United States Patent [19]

Thoma

[11] 4,232,748
[45] Nov. 11, 1980

[54] SPRAY-ASSISTED PNEUMATIC STONE-WORKING APPARATUS

[75] Inventor: Hans Thoma, Neuhausen am Rheinfall, Switzerland

[73] Assignee: SIG Schweizerische Industrie-Gesellschaft, Neuhausen am Rheinfall, Switzerland

[21] Appl. No.: 37,398

[22] Filed: May 7, 1979

[30] Foreign Application Priority Data

May 5, 1978 [DE] Fed. Rep. of Germany ....... 2819589

[51] Int. Cl.$^3$ .......................... B25D 17/16; E21C 7/08
[52] U.S. Cl. .......................................... 173/3; 137/87; 251/96
[58] Field of Search ........................ 173/3, 77; 137/87; 251/96

[56] References Cited

FOREIGN PATENT DOCUMENTS 120380 9/1945 Australia ....................................... 173/3

Primary Examiner—Robert Mackey
Attorney, Agent, or Firm—Spencer & Kaye

[57] ABSTRACT

A pneumatically operated stone-working tool has a tool drive, a spraying device for spraying the work area with a liquid and a control assembly for opening and closing the pneumatic line. The control assembly includes a valve plunger rotatably and linearly displaceably received in a chamber which is in the path of a pneumatic line feeding the tool drive and a liquid line feeding the spraying device. The plunger has a first linear position in which it maintains the pneumatic line closed regardless of the angular position of the plunger and a second linear position in which it maintains the pneumatic line open solely when the plunger is manually rotated into an "open" angular position. A force-exerting arrangement continuously urges the plunger towards its first linear position. The plunger has a work face so oriented that it is continuously exposed to a pressure of the liquid in that part of the chamber which is in communication with the liquid line. This pressure displaces the plunger into its second linear position against the effect of the force-exerting arrangement when the pressure reaches a predetermined level indicative of a safe pressure for operating the spraying device.

9 Claims, 5 Drawing Figures

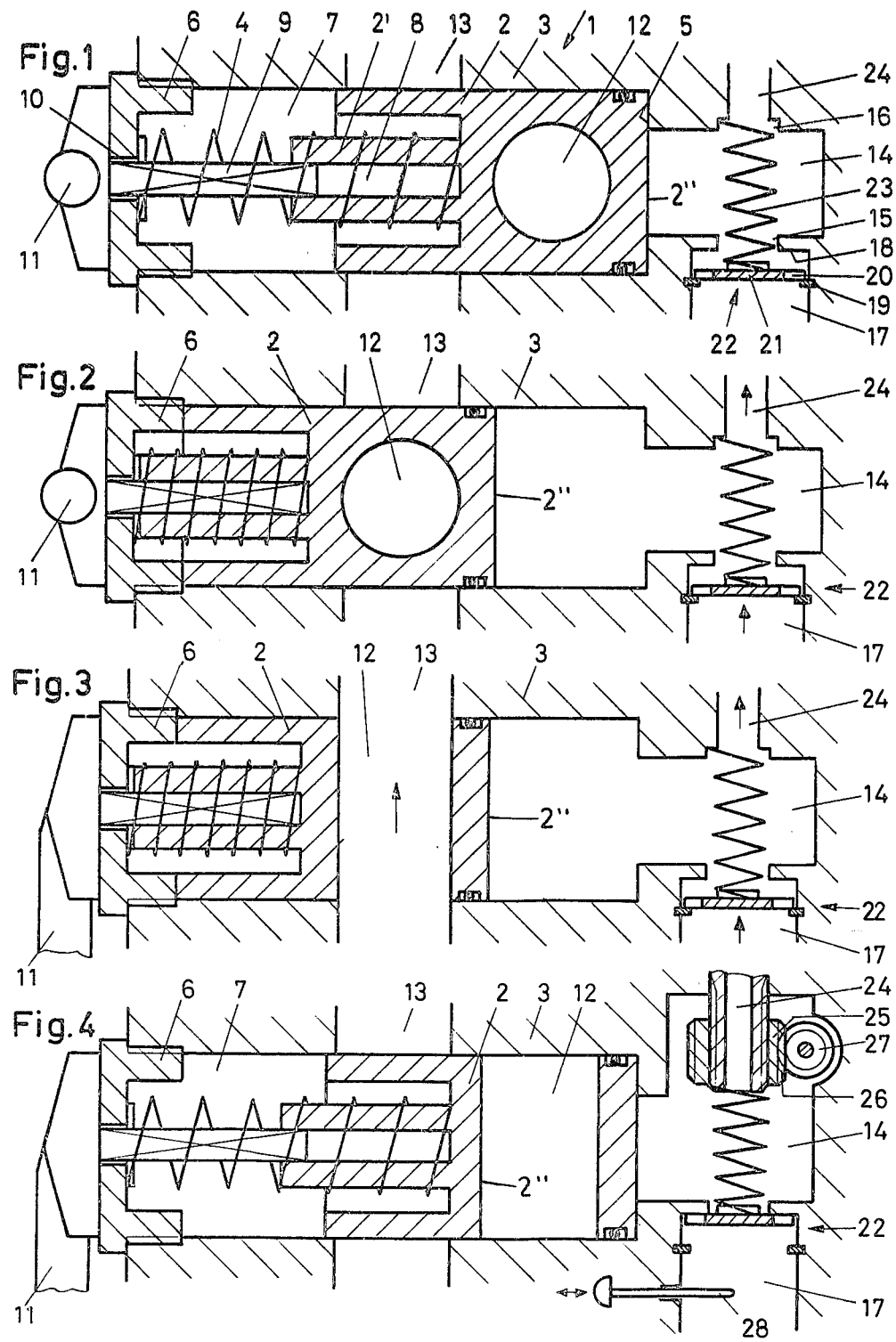

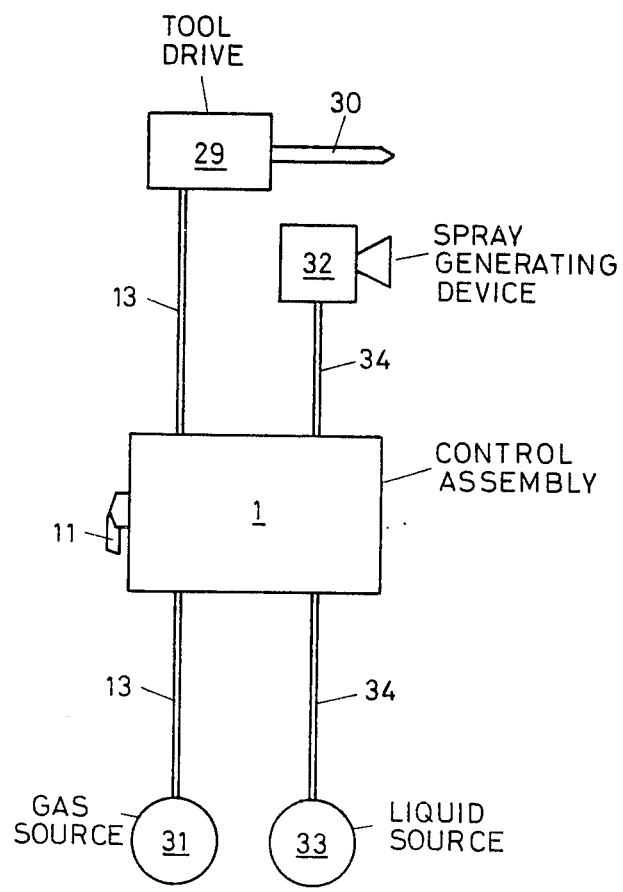

SPRAY-ASSISTED PNEUMATIC STONE-WORKING APPARATUS

BACKGROUND OF THE INVENTION

This invention relates to a pneumatically operated stone-working apparatus, such as a hammer drill which incorporates an arrangement directing a liquid spray to the work area and which includes a manually operated lever for actuating a valve plunger rotatable into open and closed positions for controlling the admission of the compressed gas to the tool drive.

In conventional power tools of the above-outlined type the risks are high that the worker, contrary to operating instructions, starts the tool drive before activating the spraying device or continues the stone-working operation during periods when the liquid spraying, for some reason, no longer takes place. The purpose of the spraying operation is to bind the dust generated during the stone working. The above-noted occurrences represent serious health hazards which, after a long while, manifest themselves mostly as silicose sickness.

SUMMARY OF THE INVENTION

It is an object of the invention to provide an improved power tool of the above-outlined type from which the discussed disadvantages are eliminated.

This object and others to become apparent as the specification progresses, are accomplished by the invention, according to which, briefly stated, the valve plunger is rotatably and linearly displaceably received in a chamber which is in the path of a pneumatic line feeding the tool drive and a liquid line feeding a liquid spray-generating arrangement. The plunger has a first linear position in which it maintains the pneumatic line closed regardless of the angular position of the plunger and a second linear position in which it maintains the pneumatic line open solely when the plunger is manually rotated into an "open" angular position. A force-exerting arrangement continuously urges the plunger towards its first linear position. The plunger has a work face so oriented that it is continuously exposed to a pressure of the liquid in that part of the chamber which is in communication with the liquid line. The pressure displaces the plunger into its second linear position against the effect of the force-exerting arrangement when the pressure reaches a predetermined level indicative of a safe pressure for operating the liquid spray-generating arrangement.

It is noted that apart from an excessively low pressure of the spraying liquid, an excessively high pressure thereof may also be harmful. The latter event, to be sure, does not present a health hazard, but it may adversely affect the proper operation of the apparatus, since seals may be damaged, resulting in a leakage of the liquid into the pneumatic drive system. An excessively high pressure may, for example, appear in case a single liquid source supplies the spraying device of several simultaneously operating power tools from the same source and most power tools are abruptly stopped at the same time. The power tools last-remaining operative would then be endangered by a pressure surge. The invention also provides for an elimination of an excessively high liquid pressure as well.

BRIEF DESCRIPTION OF THE DRAWINGS

FIGS. 1 through 4 are schematic sectional views of a preferred embodiment of the invention depicting the structure in different operational phases.

FIG. 5 is a block diagram of a pneumatically operated stone-working tool incorporating the invention.

DESCRIPTION OF THE PREFERRED EMBODIMENT

Turning now to FIGS. 1 through 4, there is shown a control assembly generally indicated at 1 for the admission or shutoff of pressurized gas in a pneumatic hammer drill. The latter may be of a conventional construction, as disclosed, for example, in Swiss Pat. No. 580,476. The control assembly has a valve plunger 2 which is disposed axially slidably and rotatably in a cylinder chamber 7 of a housing 3. The plunger 2 is, in the absence of a counter force, pressed against a shoulder 5 of the housing 3 by means of a compression spring 4. The latter is guided on a central projection 2' of the plunger 2 and engages, at one end, the plunger 2 and is, at the other end, in contact with a screw cap 6 which closes the cylinder chamber 7. The projection 2' has a central bore 8 of quadratic cross section into which extends an actuating rod 9 which also has a quadratic cross section, for providing a torque-transmitting coupling between the actuating rod 9 and the plunger 2. The rod 9 passes through an opening 10 of the cap 6 and is connected, externally of the housing 3, with a manually engageable lever 11. The plunger 2 is provided with a throughgoing diametral port 12 to provide passage for compressed air for operating the pneumatic tool. In the position shown in FIG. 1, the throughgoing port 12 is out of alignment with a pneumatic line 13 passing through the housing 3 and opening into the chamber 7. The control assembly 1 is thus in its shut-off position in which it prevents pressurized gas from being admitted to the tool drive.

Beyond the terminal shoulder 5 of the chamber 7 there is arranged, in communication with the latter, a second chamber 14 which has a smaller diameter than the cylinder chamber 7 and which is provided with an inlet opening 15 and an oppositely located outlet opening 16 for the passage of liquid (particularly water) under pressure. The wall defining an inlet channel 17 which merges into the inlet opening 15 and which is separated therefrom by a shoulder 18 carries an abutment ring 19. A toothed locking disc 21 of an excess pressure valve 22 is pressed with its teeth 20 against the ring 19 by means of a compression spring 23. At its other end, the compression spring 23 engages a shoulder which separates the outlet opening 16 from an outlet channel 24. The inlet channel 17, the inlet opening 15, the outlet opening 16 and the outlet channel 24 constitute parts of a liquid line for supplying a spray-generating device of the power tool with pressurized liquid from a liquid source. In the position shown in FIG. 1, the pressure relief valve 22 is open. It closes only if in the inlet channel 17 there is generated an impermissibly high excessive pressure which then presses all the teeth 20 of the disc 21 against the shoulder 18 by overcoming the force of the compression spring 23 as illustrated in FIG. 4.

Upon opening a valve to introduce the liquid under pressure into the spraying device, the liquid enters into the chamber 14 and exerts a continuous force against a work face 2" of the plunger 2, urging the latter towards the left, against the force of the spring 4. At normal liquid pressure, the force derived therefrom overcomes the force of the compression spring 4, thus causing the plunger 2 to be shifted into its position illustrated in FIG. 2. Since in the last-named position the port 12 of the plunger 2 is still at 90° with respect to the pneumatic line 13, the control assembly 1 still blocks transmission of pressurized air to the tool drive. Air transmission through the control assembly 1 occurs only after the plunger 2 has been brought into its angular position shown in FIG. 3 by manually turning the lever 11. This last-named position corresponds to the operational state of the power tool. If, for some reason, water supply is interrupted or falls below a predetermined rate, the force of the compression spring 4 overcomes the force derived from the water pressure in the chamber 14 and displaces the plunger 2 into its position shown in FIG. 4, into an abutting relationship with the shoulder 5, whereupon operation is automatically interrupted, since the port 12 is shifted out of alignment with the pneumatic line 13. Such a shift of the plunger 2 also occurs when the water pressure exceeds a predetermined value because in such a case—as already discussed—the valve 22 assumes its shut-off position as illustrated in FIG. 4, and thus the pressure of the water in the chamber 14 drops.

Turning now particularly to FIG. 4, for setting the liquid pressure at which the shut-off valve 22 should close, the compression spring 23 at its upper terminus engages a threaded ring 25 which at its outer periphery is provided with a toothed ring 26 engageable by a worm screw 27 which, in turn, can be set from the outside. Further, it is expedient to provide in the water inlet channel 17 an adjustable throttle 28 for regulating the pressure and the flow rate of the water.

Turning now to FIG. 5, there is illustrated in block diagram form a conventional power tool, such as a hammer drill incorporating the novel control assembly 1. The power tool comprises a pneumatic tool drive 29 which operates a tool bit 30. The tool drive 29 is supplied with a compressed gas from a gas source 31 via the pneumatic line 13. As described above, the control assembly 1 or, more particularly, its chamber 7 is arranged in the path of the pneumatic line 13. The liquid spray-generating device 32 is supplied with pressurized liquid, such as water, from a liquid source 33 via a liquid line 34. As described above, the control assembly 1 or, more particularly, its chamber 14, lies in the path of the liquid line 34 which, within the control assembly 1, includes the inlet channel 17, the inlet opening 15, the outlet opening 16 and the outlet channel 24 (not shown in FIG. 5).

It is to be understood that the above description of the present invention is susceptible to various modifications, changes and adaptations, and the same are intended to be comprehended within the meaning and range of equivalents of the appended claims.

What I claim is:

1. In a pneumatically operated stone-working tool including a tool drive, a pneumatic line connected to the tool drive for supplying pressurized gas thereto; a liquid spray-generating means for spraying the work area with a liquid; a liquid line connected to the spray-generating means for supplying liquid thereto; a control assembly for effecting energization and de-energization of the tool drive; the control assembly including a rotatable valve plunger in the pneumatic line; the valve plunger having a first angular position in which it maintains the pneumatic line open for allowing pressurized gas to be admitted to the tool drive from a source of pressurized gas; the valve plunger further having a second angular position in which it maintains the pneumatic line closed for preventing pressurized gas to be admitted to the tool drive; and a manually actuated lever connected to the valve plunger for rotating the valve plunger into the first or second angular position; the improvement wherein said control assembly comprises (a) means defining a valve chamber in which said valve plunger is rotatably and linearly slidably received; said chamber being in the path of said pneumatic line and said liquid line; said plunger having a first linear position in which it maintains said pneumatic line closed in either angular position of said plunger and a second linear position in which it maintains said pneumatic line open solely when said plunger is in its said first angular position;

(b) force-exerting means continuously urging said plunger towards its said first linear position with a predetermined force; and (c) a work face forming part of said plunger and being oriented for continuous exposure to a pressure of the liquid in that part of said chamber which is in communication with said liquid line; said pressure acting on said work face against said predetermined force for displacing said plunger into its said second linear position when said pressure increases to a predetermined level indicative of a safe pressure for operating said liquid spray-generating means.

2. A pneumatically operated stone-working tool as defined in claim 1, further comprising means defining a throughgoing port in said plunger; said port being oriented transversely to the direction of linear displacement of said plunger; said port being in registry with said pneumatic line solely when said plunger is simultaneously in said first angular position and in said second linear position.

3. A pneumatically operated stone-working tool as defined in claim 1, wherein said valve chamber comprises a cylinder chamber accommodating said plunger and an additional chamber being in communication with said cylinder chamber; said work face of said plunger being oriented towards said additional chamber.

4. A pneumatically operated stone-working tool as defined in claim 1, further comprising an abutment in said chamber for limiting the extent of the linear displacement of said plunger for determining said first linear position thereof.

5. A pneumatically operated stone-working tool as defined in claim 4, further comprising a housing in which said valve chamber is formed; said abutment comprising a shoulder forming part of said housing.

6. A pneumatically operated stone-working tool as defined in claim 1, further comprising a closure cap closing off an end of said chamber remote from said work face of said plunger; an actuating rod passing through said closure cap and having a first end portion affixed to said manually actuated lever and a second end portion torque-transmittingly and relatively slidably coupled to said plunger; said force-exerting means comprising a compression spring having a first end engaging said closure cap and a second end engaging said plunger.

7. A pneumatically operated stone-working tool as defined in claim 1, further comprising an excess pressure valve arranged in said liquid line upstream of said chamber as viewed in the direction of liquid flow in said liquid line towards said spray-generating means, for closing said liquid line when the liquid exceeds a predetermined pressure, whereby the liquid pressure in said valve chamber drops below said predetermined level.

8. A pneumatically operated stone-working tool as defined in claim 7, further comprising adjusting means for manually setting said excess pressure valve at a desired pressure to which the excess pressure valve responds.

9. A pneumatically operated stone-working tool as defined in claim 8, further comprising an adjustable throttle means in said liquid line upstream of said excess pressure valve for setting the flow rate of the liquid at a desired. value.

* * * * *